United States Patent
Wei et al.

(10) Patent No.: US 8,773,404 B2
(45) Date of Patent: Jul. 8, 2014

(54) ELECTROMAGNETIC PEN, ELECTROMAGNETIC SIGNAL TRANSMISSION METHOD AND PROCESSING METHOD, APPARATUS AND DEVICE

(75) Inventors: Jiangli Wei, Shenzhen (CN); Xuanming Shi, Shenzhen (CN)

(73) Assignee: Taiguen Technology (Shen_Zhen) Co., Ltd., Guangdong Province (CN)

( * ) Notice: Subject to any disclaimer, the term of this patent is extended or adjusted under 35 U.S.C. 154(b) by 49 days.

(21) Appl. No.: 13/274,923

(22) Filed: Oct. 17, 2011

(65) Prior Publication Data
US 2012/0068975 A1    Mar. 22, 2012

Related U.S. Application Data

(63) Continuation of application No. PCT/CN2010/071810, filed on Apr. 16, 2010.

(30) Foreign Application Priority Data

Apr. 16, 2009  (CN) .................... 2009 1 0082463.6

(51) Int. Cl.
*G06F 3/033*   (2013.01)
(52) U.S. Cl.
USPC ........... 345/179; 345/156; 345/173; 345/174; 178/18.01; 178/18.07; 178/19.01; 178/20.01; 178/20.03
(58) Field of Classification Search
USPC .............................. 345/179; 178/18.01–20.04
See application file for complete search history.

(56) References Cited

U.S. PATENT DOCUMENTS

| | | | | |
|---|---|---|---|---|
| 4,697,050 | A | * | 9/1987 | Farel et al. ................ 178/19.07 |
| 4,806,707 | A | * | 2/1989 | Landmeier ................ 178/19.05 |
| RE34,187 | E | * | 3/1993 | Yamanami et al. ........ 178/18.07 |

(Continued)

FOREIGN PATENT DOCUMENTS

| CN | 101539816 A | 9/2009 |
|---|---|---|
| CN | 101539816 B | 10/2012 |

(Continued)

OTHER PUBLICATIONS

International Search Report of International Application No. PCT/CN2010/071810, dated Jul. 29, 2010.

(Continued)

*Primary Examiner* — Jesus Hernandez
(74) *Attorney, Agent, or Firm* — J.C. Patents

(57) ABSTRACT

An electromagnetic pen, an electromagnetic signal transmission method and an electromagnetic signal processing method, a processing device and a processing apparatus comprises: a reference inductance and a reference capacitor, connected with each other in parallel in a housing of the electromagnetic pen and configured to transmit an electromagnetic signal in a handwritten frequency; a control capacitor, connected with the reference capacitor in parallel and controlled by a control switch connected in series so as to transmit an electromagnetic signal in a control frequency. The processing device comprises: a receiving identification module, configured to receive the electromagnetic signal transmitted by the electromagnetic pen and identify a frequency of the electromagnetic signal; a handwritten input module, configured to input a handwritten symbol when the identified frequency is within a range of the handwritten frequency; and a control input module, configured to input a control signal.

5 Claims, 7 Drawing Sheets

(56) References Cited

U.S. PATENT DOCUMENTS

| | | | |
|---|---|---|---|
| 5,355,100 A * | 10/1994 | Riggio, Jr. | 331/173 |
| 5,528,002 A * | 6/1996 | Katabami | 178/19.06 |
| 5,736,980 A * | 4/1998 | Iguchi et al. | 345/179 |
| 5,793,360 A * | 8/1998 | Fleck et al. | 345/179 |
| 6,005,555 A | 12/1999 | Katsurahira et al. | 345/174 |
| 2002/0181744 A1* | 12/2002 | Vablais et al. | 382/107 |
| 2004/0095333 A1* | 5/2004 | Morag et al. | 345/173 |
| 2008/0150658 A1 | 6/2008 | Vos | 334/15 |
| 2008/0150916 A1 | 6/2008 | Vos | 345/179 |

FOREIGN PATENT DOCUMENTS

| | | |
|---|---|---|
| JP | 07-200131 A | 8/1995 |
| JP | 07/239746 A | 9/1995 |
| JP | 2002-244806 A | 8/2002 |
| JP | 2007-102369 A | 4/2007 |

OTHER PUBLICATIONS

Japanese Examination Report of corresponding Japanese Application No. 2012-505038, dated on Jun. 25, 2013.

* cited by examiner

ELECTROMAGNETIC PEN, ELECTROMAGNETIC SIGNAL TRANSMISSION METHOD AND PROCESSING METHOD, APPARATUS AND DEVICE

CROSS-REFERENCE TO RELATED APPLICATIONS

This application is a continuation of International Application No. PCT/CN2010/071810 filed on Apr. 16, 2010, which claims the priority benefit of Chinese Patent Application No. 200910082463.6, filed on Apr. 16, 2009. The contents of the above identified applications are incorporated herein by reference in their entirety.

FIELD OF THE TECHNOLOGY

The present invention relates to an electromagnetic induction type input technology, particularly, to an electromagnetic pen, an electromagnetic transmission method and a processing method, a device and an apparatus.

BACKGROUND

With the increasing popularity of portable apparatuses such as a mobile phone, a Personal Digital Assistant (hereafter to be referred as PDA), a notebook computer and so on, the input modes are becoming more and more humanized. Touch screen technology has become one of the simplest and the most convenient man-machine interactive input technologies. Currently, the mainstream touch screen technology has the following several types: a resistance type, a capacitance type, an infrared type and an inductance type.

Among them, a handwritten input apparatus with an inductance type touch screen consists of a touch pen, an antenna array board and a corresponding identification processing circuit. The touch pen is also called as an electromagnetic pen, wherein an LC oscillator is installed and used for transmitting electromagnetic signals in fixed frequency. A display panel and the antenna array board are overlapped together. The antenna array board consists of a plurality of the antennas covering the whole display panel and has at least two layers, which are used for detecting coordinate positions in the horizontal and vertical directions respectively. When the electromagnetic pen is close to or touches the display panel, the electromagnetic signal in the electromagnetic pen facilitates some of the antennas of the antenna array board to have a resonance and then generate oscillatory waves with the same frequency. Through the analysis for amplitudes and frequency of the oscillatory waves, the coordinate position of the electromagnetic pen relative to the display panel can be calculated. For example, in the U.S. patent application Ser. No. 06/937,231, it proposes a passive input pen with LC resonance. That is, the handwritten input can be realized based on electromagnetic induction principle.

Currently, with the development of handwritten input technology, people make higher requests for controllability, operational convenience and other aspects of the handwritten input technology. However, due to the richness of input information, this prior electromagnetic pen can not match up with the operations of humanized input software and the interface thereof, resulting in limiting the development of the industry for touch type input products with richer input means.

SUMMARY

An object of the present invention is to provide an electromagnetic pen, an electromagnetic signal transmission method and a processing method, a device and an apparatus. With the rich functions of electromagnetic induction type input, the controllability thereof and operational convenience of handwritten input are improved.

In order to realize the abovementioned object, the present invention provides an electromagnetic pen, comprising:

a reference inductance and a reference capacitor, which are connected with each other in parallel in a housing of the electromagnetic pen and configured to transmit an electromagnetic signal in a handwritten frequency;

at least one control capacitor, which is connected with the reference capacitor in parallel;

the control capacitor is connected with one control switch in series, and the control switch is on or off for connection or disconnection between the control capacitor and the reference capacitor, thereby an electromagnetic signal in a control frequency can be transmitted.

In order to realize the abovementioned object, the present invention also provides an electromagnetic signal transmission method , comprising:

transmitting an electromagnetic signal in a handwritten frequency by an electromagnetic pen by means of a reference inductance and a reference capacitor which are connected in parallel in the electromagnetic pen; and transmitting an electromagnetic signal in a control frequency by the electromagnetic pen.

In order to realize the abovementioned object, the present invention also provides an electromagnetic signal processing device, comprising:

a receiving identification module, which is configured to receive an electromagnetic signal transmitted by an electromagnetic pen through an antenna array, and identify a frequency of the electromagnetic signal;

a handwritten input module, which is configured to input a handwritten symbol when the identified frequency of the electromagnetic signal is within a range of a handwritten frequency; and a control input module, which is configured to input a control symbol when the identified frequency of the electromagnetic signal is within a range of control frequency.

In order to realize the abovementioned object, the present invention also provides an electromagnetic signal processing method, comprising:

receiving an electromagnetic signal through an antenna array and identifying a frequency of the electromagnetic signal;

inputting a handwritten symbol when the identified frequency of the electromagnetic signal is within a range of handwritten frequency; and inputting a control symbol when the identified frequency of the electromagnetic signal is within a range of control frequency.

In order to realize the abovementioned object, the present invention also provides an electromagnetic induction apparatus comprising the electromagnetic pen and the electromagnetic signal processing device of the present invention. The apparatus further provides an antenna array, a display panel and a control processor. The antenna array is connected with the electromagnetic signal processing device, and configured to receive the electromagnetic signal transmitted by the electromagnetic pen and transmit the signal to the electromagnetic signal processing device for identification. The electromagnetic signal processing device is connected with the control processor and configured to input the identified handwritten symbol or control symbol to the control processor.

With the abovementioned technical solutions, the present invention adopts the technical means to switch between inputting the handwritten symbol and the control symbol according to the electromagnetic signals with different frequencies transmitted by the electromagnetic pen, thereby obtains the technical effect that the shortcut control can be achieved with the electromagnetic pen simply and conveniently; hence, the input mode of electromagnetic induction type input technology and input functions can be enriched.

DETAILED DESCRIPTION

The present invention will be described in the combination of examples and the drawings in detail.

FIRST EXAMPLE

Figure 1:
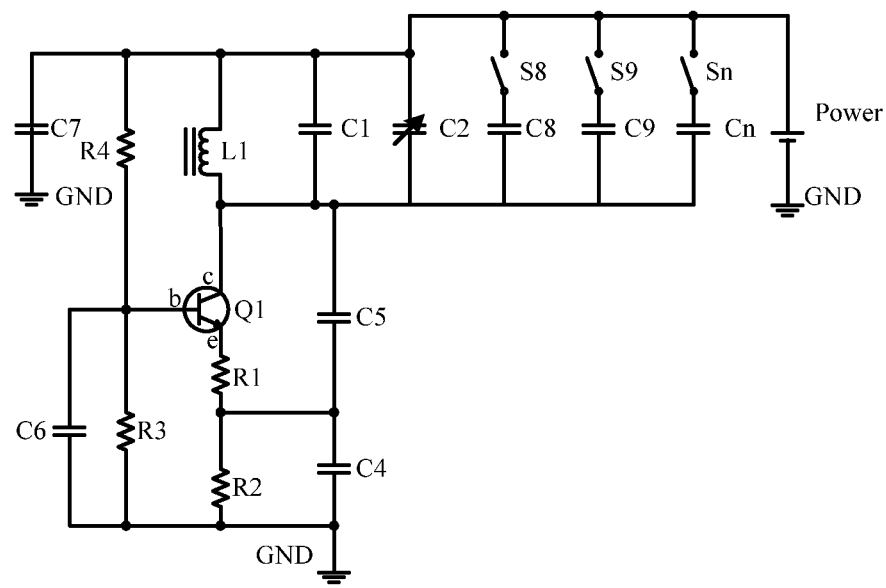
FIG. 1 is a circuit schematic diagram of an electromagnetic pen provided by a first example of the present invention.
Figure 2:
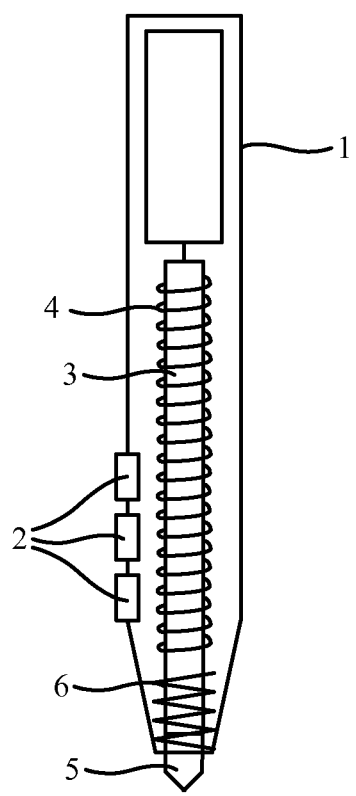
FIG. 2 is a structural schematic diagram of the electromagnetic pen provided by the first example of the present invention.

FIG. 1 is a circuit schematic diagram of an electromagnetic pen provided by the first example of the present invention. FIG. 2 is a structural schematic diagram of the electromagnetic pen provided by the first example of the present invention. As shown in FIG. 1, the electromagnetic pen comprises a reference inductance L1 and a reference capacitor C1, which are provided in a housing of the electromagnetic pen and connected with each other in parallel, for transmitting an electromagnetic signal in a handwritten frequency, and inputting a corresponding handwritten symbol according to a sliding track of the electromagnetic pen. The so-called handwritten frequency is a frequency in which the electromagnetic pen inputs the handwritten symbol. The reference inductance L1 and the reference capacitor C1 are connected with a power supply circuit. When the power supply circuit is turned on and provides the power, the electromagnetic signal in the handwritten frequency is transmitted immediately. The electromagnetic pen also comprises at least one control capacitor. Specifically, the present example comprises three control capacitors C8, C9 and Cn. In practice, there may be one or more control capacitors. The control capacitors C8, C9 and Cn are connected with the reference capacitor C1 in parallel, respectively. Each of the control capacitors C8, C9 and Cn is connected with one control switch in series, i.e., S8, S9 and Sn. The control switches S8, S9 and Sn are on or off for the connection or disconnection between the corresponding control capacitors C8, C9, Cn and the reference capacitor C1, thereby changing the frequency of the electromagnetic signal and transmitting the electromagnetic signal in the control frequency to input the control symbol. The so-called control frequency is a frequency in which the electromagnetic pen inputs the control symbol. With the combination of the different capacitors, a plurality of control frequencies with different values can be obtained. The electromagnetic pen can represent different control symbols by changing the frequency values within the range of the control frequency. Or, the electromagnetic pen can also input the control symbols where under the control frequency, the sliding track of the electromagnetic pen is changed and different sliding tracks are identified by the corresponding software.

The electromagnetic pen of the present example can transmit electromagnetic signals of different frequencies through the connection with different control capacitors in parallel. The difference between the frequencies of the electromagnetic signals can be regarded as a flag which can distinguish a handwritten input from a control input, so that the electromagnetic signals in different input modes can be distinguished, thereby switching among the identification programs.

As shown in FIG. 2, the electromagnetic pen comprises a housing 1, which can be in cylinder-shape. The circuit structure shown in FIG. 1 is provided in the cylinder-shaped housing 1. One or more control buttons 2 can be further provided on the cylinder-shaped housing 1. Each of the control buttons is connected with a corresponding control switch such that the control switch can be on when the control button 2 is pressed, while the control switch can be off when the control button 2 is released. Advantageously, the control buttons 2 are provided at the front end of the housing 1 of the electromagnetic pen to facilitate the buttons to be pressed. There are many modes to realize the circuit design of the electromagnetic pen of the present example. One specific realization mode is that the reference inductance L1 comprises a magnetic core 3 and an inductance coil 4. The shape of the magnetic core 3 is preferably in strip shape. The magnetic core 3 and the inductance coil 4 are both provided in the cylinder-shaped housing 1. The inductance coil 4 is wound out of the magnetic core 3 and forms a sleeving. The inductance coil 4 is connected with the reference capacitor C1 in parallel to form an LC oscillator, and they connected with a power supply circuit in parallel. The magnetic core 3 elastically bears against a pen tip 5 extending out of the housing 1 of the electromagnetic pen with an elastic device 6. When the pen tip 5 touches a display screen and is pressed, the magnetic core 3 moves axially along the inductance coil 4 by means of the movement of pen tip 5. At this time, the inductance parameters can be changed, and further the frequency of the electromagnetic signal can be changed. In the cylinder-shaped housing 1, the elastic device 6 can be a spring, which is provided in front of the magnetic core 3. A Printed Circuit Board (hereafter to be referenced as PCB), batteries and other accessories can be provided in back of the magnetic core 3.

The relative position of the inductance coil to the magnetic core, the number of turns of the inductance coil, the elastic coefficient of the elastic device and so on are set so that the changeable inductance parameters can be designed, thereby controlling the change range of the frequency of electromagnetic signal under the action of control pressure. The change range of frequency under the action of pressure is limited within the difference between control frequency and handwritten frequency, so that the frequency of the electromagnetic signal can be changed to some extent based on the handwritten frequency, or changed to some extent based on the control frequency. However, the change range of the handwritten frequency is not overlapped with the change range of the control frequency, and the frequency of the electromagnetic signal can be still identified.

The operation principle of the electromagnetic pen of the present example is that after the power is turned on, LC oscillation formed by the reference inductance and the reference capacitor continuously transmits the electromagnetic signals in certain frequency. The frequency of the electromagnetic signal transmitted when the control switch is off is the handwritten frequency. When the electromagnetic pen is close to the display screen, the magnetic lines of force of an electromagnet pass through an electromagnetic antenna array attached to the back of the display screen, and an induction current is induced by corresponding coils in a touch control inductance layer. The induction current changes with the change of distance between the pen and the antenna array. Furthermore, after the pen tip of the electromagnetic pen presses against the display screen, the movement of the pen core causes the magnetic core to move, and then the value of the reference inductance is changed, thereby causing the frequency of LC oscillation to be changed. Furthermore, when the control button on the electromagnetic pen having a special function and connected with a control capacitor is pressed, the control capacitor and the reference capacitor can be connected with each other in parallel, thereby changing the frequency of LC resonance. When the electromagnetic pen is close to the antenna array, according to Faraday law of electromagnetic induction, if a magnetic flux passing a loop changes, an induced electromotive force $\epsilon_{induction}$ in the loop is in proportion to magnetic flux variation $\phi/t$. That is, $\epsilon_{induction}=n\,\phi/t$. As the distances between different antennas and the electromagnetic pen are different, electromagnetic waves with relative large amplitudes are induced on the antennas close to the electromagnetic pen. A control circuit scans each antenna, then the positions of several antenna coils producing induction electromagnetic waves with relative large amplitudes are determined. Furthermore, through receiving the electromagnetic signal with such amplitude and frequency in change, the accurate position of the electromagnetic pen and the pressure against the screen from the electromagnetic pen can be calculated. That is, the sliding track of the electromagnetic pen on the display screen can be identified, and the control buttons are determined whether they are pressed or not. Hence, these massages are transmitted to a host machine through the peripheral interface, for example, Universal Serial BUS (hereafter to be referenced as USB), "RS232" interface, and so on, of PC or other embedded devices. After an identification program on the host machine receives these input massages, this program can transform the massages into the corresponding control symbols, thereby realizing the control and operation for the host machine, for example, the identification of characters or forms, mapping, calling of shortcut keys, etc.

With the abovementioned technical solution, the electromagnetic pen not only can output the electromagnetic signal in the handwritten frequency and carry out a handwritten input, but also can characterize the touch pressure against the screen from the electromagnetic pen by using the frequency of the electromagnetic signal, thus further the characteristics such as the thickness of handwritten strokes and so on can be embodied.

In order to optimize the performance of the electromagnetic pen in respect of transmitting the electromagnetic signals, other electric elements such as resistances, capacitors and transistors can be provided in the electromagnetic pen. For example, a capacity regulator C2 can be used for regulating the LC resonant frequency to a fixed frequency which is desirable and not susceptible to the outer noises.

The electromagnetic pen provided by the present example of the invention belongs to a coordinate input pen, and further is a multi-function coordinate input pen with frequency conversion ability. The pen not only can indicate the coordinate position thereof through frequency, but also can realize the control for special functions through the frequency conversion. The pen can provide other control information except coordinate and pen pressure information to an antenna array board and some identification circuits. The electromagnetic signals with different frequencies can be transformed into different input instructions. For example, some application software such as handwriting software, mapping software, etc can be initiated by buttons. Some function of the application software, such as exchanging ink or handwriting in the mapping software, can also be initiated through buttons.

The electromagnetic pen has the function of frequency conversion, such that it is further allowed that a plurality of electromagnetic pens can be operated at the same time. Thereby, a plurality of the electromagnetic pens transmit the electromagnetic singles with different frequencies through the buttons, so that the electromagnetic signals can be distinguished from each other without chaotic control, and a plurality of the electromagnetic pens can simultaneously operate and control systems.

SECOND EXAMPLE

Figure 3:
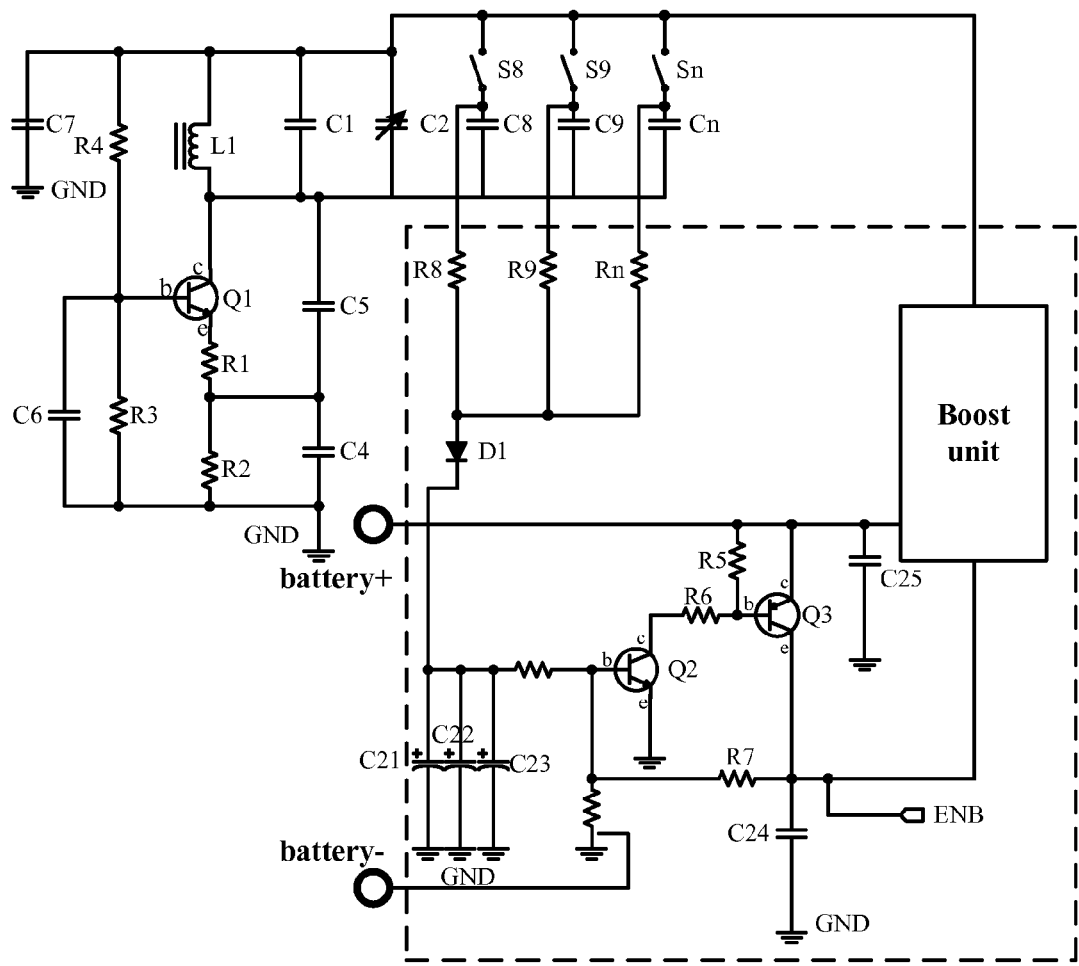
FIG. 3 is a circuit schematic diagram of an electromagnetic pen provided by a second example of the present invention.

FIG. 3 is a circuit schematic diagram of an electromagnetic pen provided by a second example of the present invention. This example can be based on the first example. A battery can be taken as the power therein, for example, a common dry battery or rechargeable battery. A reference inductance L1 and a reference capacitor C1 which are connected with each other in parallel are connected with a power supply circuit of battery. Furthermore, a power control loop is connected with the power supply circuit of the electromagnetic pen, as shown in the dashed box of FIG. 3. In order to obtain the normal operating voltage of the electromagnetic pen, for example, 5V, generally, a boost processing is carried out for the voltage of the battery. The basic structure of the power control loop comprises a boost unit, a first transistor Q3, a second transistor Q2 and a charging and discharging capacitor. The charging and discharging capacitor of the present example are three capacitors C21, C22 and C23 which are connected with each other in parallel.

The boost unit can connect the reference inductance L1 and the reference capacitor C1 with the power supply circuit. The connection between the battery and the power supply circuit can be realized when there is no boost function. The boost unit has an enable end (ENB). When an enable signal is input into the ENB, the boost function of the boost unit starts to work.

The first transistor Q3 is connected with the boost unit, and is used for producing the enable signal transmitted to the boost unit when the first transistor is turned on, so as to enable the boost function of the boost unit. Specifically, a collector c of the first transistor Q3 is connected with a positive electrode of the battery, and an emitter e thereof is connected with the ENB of the boost unit. When the first transistor Q3 is turned on, the electric potential of the emitter is increased. That is, the ENB generates an enable signal with high level.

The second transistor Q2 is connected with the first transistor Q3 and configured to turn on the first transistor Q3 when the second transistor Q2 is turned on. Specifically, a collector c and an emitter e of the second transistor Q2 are connected between a base b of the first transistor Q3 and the ground. A base b of the second transistor Q2 is connected with each control switch S8, S9 and Sn respectively through one diode D1 in the power supply circuit.

The charging and discharging capacitors C21, C22 and C23 are connected in the power supply circuit through the control switches S8, S9 and Sn, and configured to be charged by the power supply circuit when any one of the control switches S8, S9 and Sn is on; furthermore, when the control switches S8, S9 and Sn are all off, the capacitors supply power to the second transistor Q2 to maintain the second transistor Q2 being turned on.

The operation principle of the power control loop is introduced in detail as follows:

When the electromagnetic pen is under un-operating state, the positive electrodes of the reference induction L1 and the reference capacitor C1 can be called as operation voltage electrodes (VCC), which are connected with the positive electrode of the battery through the boost unit, specifically, through one diode in the boost unit. At this time, the base b and the emitter e of the second transistor Q2 are both in low potential. Hence, the second transistor Q2 is turned off, and then the collector c of the second transistor Q2 is in high potential. Meanwhile, the collector c of the first transistor Q3 is in high potential, and the emitter e is connected with the ground through one capacitor C24; therefore, the first transistor Q3 is turned off, and the ENB is in low potential. Then, the boost unit does not have the boost function, and accordingly the reference inductance L1 and the reference capacitor C1 can not be driven to transmit the electromagnetic signals.

When any one control button is pressed, and the corresponding control switch is on, the voltage of the battery is coupled to the second transistor Q2 through resistor R5 and resistor R6, thereby facilitating the second transistor Q2 to be turned on; therefore the potential of the base b of the first transistor Q3 is pulled down to make the first transistor Q3 turn on. Then, a high electrical level is generated at the emitter e of the first transistor Q3, thereby facilitating the signal of the ENB be in high electrical level. That is, the enable signal is input, and thus the boost function of the boost unit is initiated. Meanwhile, the three charging and discharging capacitors C21, C22 and C23 are charged.

After the operation of the electromagnetic pen is initiated, the control button is not pressed, then the control switch is off. The second transistor Q2 is maintained to be turned on by the discharge of the charging and discharging capacitors C21, C22 and C23. The maintaining time can be determined by selecting the capacitance values of the charging and discharging capacitors C21, C22 and C23. For example, the maintaining time can be 20 minutes, or other preset time span. After this period of time, if the control buttons are not pressed to connect the control switches, the charging and discharging capacitors C21, C22 and C23 are discharged completely, then the second transistor Q2 is turned off; that is, the electromagnetic pen has been ceased to work. Then the first transistor Q3 is turned off, the ENB is in low electrical level, so that the boost function of the boost unit is off, and the reference inductance L1 and the reference capacitor C1 do not transmit the electromagnetic signal anymore, thereby achieving the purpose of power saving.

The abovementioned power control loop may also comprise one low-voltage detecting unit connected in the power supply circuit. Specifically, the low-voltage detecting unit can be integrated with the boost unit together, for detecting the power supply circuit, particularly the voltage of the battery. When the voltage of the power supply circuit is lower than the preset voltage value, an alerting signal is transmitted immediately. Fox example, when the detected voltage of the battery is decreased less than 0.9V, the low-voltage detecting unit can detect the low voltage and light one Light Emitting Diode (hereafter to be referenced as LED) to give a prompt to users to replace the battery.

In the present example, the power control loop is added in the electromagnetic pen, and the mode of active input pen is adopted. This can solve the problem that where the mode of passive input pen is adopted, the antenna array having the intensive coils is high in cost and the antenna array board needs to continually transmit electromagnetic waves causing too much electric energy consumed. With the power control loop, the power supply is automatically turned off when the electromagnetic pen is not operated, thereby avoiding the consumption of electric energy. The operating current is allowed to be lower than 1 mA. As for one alkaline cell, it can be used continuously for over 400 hours, therefore, the user can be avoided to replace the battery too frequently. The abovementioned circuit structure has the advantages of simple design and low cost, and can reduce the power consumption at the antenna array board side. As for the portable products, the size of the power consuming apparatus can be reduced to facilitate the products to be light and thin.

Alternatively, the power control loop in the present invention also can adopt other modes to control the power. For example, one vibroswitch connected in the power supply circuit in series is provided. When the electromagnetic pen is used, the vibroswitch can detect the vibration of the electromagnetic pen and keep ON state, so that the power supply circuit is turned on to provide the power. When the electromagnetic pen is not used, the vibroswitch can not identify the vibration and will turn the power supply circuit off to save power.

THIRD EXAMPLE

Figure 4:
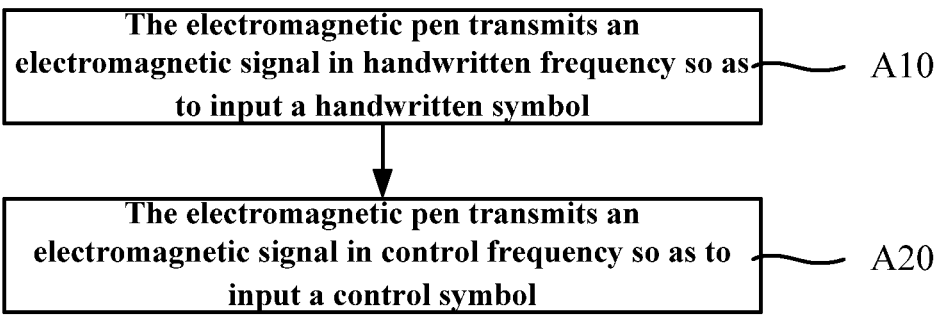
FIG. 4 is a flow diagram of an electromagnetic signal transmission method provided by a third example of the present invention.

FIG. 4 is a flow diagram of an electromagnetic signal transmission method of provided by a third example of the present invention. The present example can be carried out by the electromagnetic pen of the present invention, which specifically comprises the following steps:

Step A10, the electromagnetic pen transmits an electromagnetic signal in a handwritten frequency by means of the reference inductance and the reference capacitor which are connected with each other in parallel, so as to input a handwritten symbol.

Step A20, the electromagnetic pen transmits an electromagnetic signal in a control frequency to input a control symbol.

The technical solution of the present example can switch the input modes of the electromagnetic pen on the antenna array board by changing the frequency of the electromagnetic signal transmitted from the electromagnetic pen, which is simple and easy. The electromagnetic pen can have a plurality of input modes, comprising at least an input handwritten symbol mode and an input control symbol mode. Under the different modes, the sliding track of the electromagnetic pen or the frequency of the electromagnetic signal can have different meanings, which enriches the handwritten input functions of the electromagnetic pen.

The electromagnetic signal transmitted by the electromagnetic pen is transmitted by the resonance of the reference induction and the reference capacitor. The frequency can be changed by changing the parameters of the reference inductance and the reference capacitor in various modes. For example, in the electromagnetic pen, at least one control capacitor can be in parallel connection with the reference inductance and the reference capacitor which transmit the electromagnetic signal in handwritten frequency, so as to transmit the electromagnetic signal in a control frequency which is determined by the reference inductance, the reference capacitor and the control capacitor. Or the frequency of the electromagnetic signal can be changed by decreasing a capacitance value, increasing or decreasing an inductance value, adding a control resistor and the like.

The mode of transmitting the electromagnetic signal in the control frequency by the electromagnetic pen to input the control symbol can specialized as:

when the electromagnetic pen transmits the electromagnetic signal in the control frequency, the frequency value of the electromagnetic signal is changed in the set range of the control frequency to input the control symbols, wherein different control frequency values signify different control symbols.

Alternatively, the electromagnetic pen changes the sliding track thereof in the control frequency to input the control symbol.

The electromagnetic pen can also combine the control frequency with the sliding track to input the control symbol.

FOURTH EXAMPLE

Figure 5:
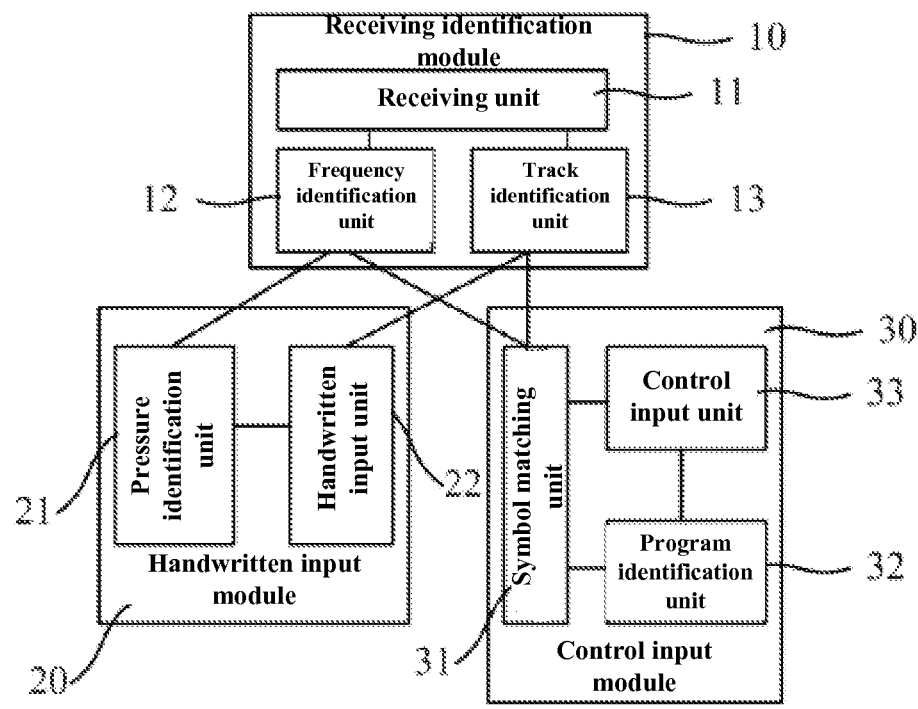
FIG. 5 is a structural schematic diagram of an electromagnetic signal processing device provided by a fourth example of the present invention.

FIG. 5 is a structural schematic diagram of an electromagnetic signal processing device provided by a fourth example of the present invention. The electromagnetic signal processing device of the present example can serve as a device that is connected with an antenna array to receive and identify the electromagnetic signals. The electromagnetic signal processing device particularly comprises a receiving identification module 10, a handwritten input module 20 and a control input module 30, wherein the receiving identification module 10 is configured to receive the electromagnetic signal transmitted by the electromagnetic pen through the antenna array, and identify the frequency of the electromagnetic signal; the handwritten input module 20 is configured to input the handwritten symbol when the result identified by the receiving identification module 10 is that the frequency of the electromagnetic signal is within the range of the handwritten frequency; and the control input module 30 is configured to input the control symbols when the result identified by the receiving identification module 10 is that the frequency of the electromagnetic signal is within the range of the control frequency.

With the adoption of the technical solution of the present example, after the electromagnetic signal is received, the receiving identification module firstly identifies the frequency of the electromagnetic signal, determines that the frequency of the electromagnetic signal is in which set frequency range by comparison, and determines the current input mode of the electromagnetic pen according to frequency identification result.

Based on the abovementioned technical solution, specifically, the receiving identification module 10 may comprise a receiving unit 11 and a frequency identification unit 12, wherein the receiving unit 11 is configured to receive the electromagnetic signal transmitted by the electromagnetic pen through the antenna array; and the frequency identification unit 12 is configured to identify the frequency of the electromagnetic signal. The receiving identification module 10 may also comprise a track identification unit 13, wherein the track identification unit 13 is configured to identify the sliding track of the electromagnetic pen and supply the sliding track to the handwritten input module 20 and/or the control input module 30 as the basis of converting the handwritten symbol or the control symbol. Furthermore, the electromagnetic signal processing device can correspondingly convert the sliding track of the electromagnetic pen on a display screen into the handwritten symbol or the control symbol to be input.

In the technical solution of the present example, the functions of electromagnetic induction type handwritten input can be enriched, and the input modes of the electromagnetic pen can be switched conveniently through frequency conversion.

Based on the abovementioned technical solution, specifically, the handwritten input module 20 can comprise a pressure identification unit 21 and a handwritten input unit 22, wherein the pressure identification unit 21 is configured to calculate a difference between the frequency of the electromagnetic signal and the handwritten reference frequency when the identified frequency of the electromagnetic signal is within the range of the handwritten frequency, and identify a handwritten pressure of the electromagnetic pen according to the difference; and the handwritten input unit 22 is configured to generate the handwritten symbol to be input according the sliding track and the handwritten pressure.

In the abovementioned technical solution, the frequency of the electromagnetic signal can be overlaid by the frequency of the handwritten pressure based on the handwritten reference frequency, for example, in the abovementioned example, the pen tip 5 of the electromagnetic pen presses the display screen, the reference inductance value is changed by changing the position of the magnetic core, so as to change the frequency of the electromagnetic signal. After the identified frequency of the electromagnetic signal is within the range of the handwritten frequency, the frequency of the handwritten pressure is further identified, namely, the pressure of pressing the display screen by the electromagnetic pen is identified, so that the handwritten symbols are generated by the sliding track and the handwritten pressure. Thereby, the input information of the handwritten symbols can be enriched.

Based on the abovementioned technical solution, specifically, the control input module 30 comprises a symbol matching unit 31, a program identification unit 32 and a control input unit 33, wherein the symbol matching unit 31 is configured to compare the sliding track with preset shortcut symbols when the identified frequency of the electromagnetic signal is within the range of the control frequency, the shortcut symbols such as "←", "↑", "↓", "→", ">", ")" and the like can be stored in advance; the input sliding track and the shortcut symbols can be compared according to the technologies such as the fuzzy identification technology and the like.

The input sliding track used for control function can consist of simple and easily-memorized strokes which can be input by clicking or sliding, and generally, the sliding refers to at least 10 mm moving. The program identification unit 32 is configured to identify an identification of a current running program, i.e., the identification of the current running program on a PC machine or a controller that is connected with the electromagnetic signal processing device, when the sliding track is successfully matched with the shortcut symbols. The control input unit 33 is configured to inquire and acquire a corresponding control symbol according to the identification of the current running program and the shortcut symbol and then transmit the corresponding control symbol to the current running program for performing a control operation. Different shortcut symbols correspond to different running programs, so as to realize different control meanings, for example, when the current running program is a "Word" processing program, the symbols "↑" and "↓" can represent upward page rolling and downward page rolling; and when the current running program is a "Windows Media Player", the symbols "←" and "→" can represent a previous song and a next song, "↑" and "↓" can control volume up and volume down, and ">" and ")" can be used for controlling the start of playing and the pause of playing. At present, various known application programs have the shortcut key input and control function, for example, the application programs include "Windows Media Player", image and fax viewer, "Windows Internet Explorer", "Outlook Express", "Microsoft Office-PowerPoint", "Microsoft Office-Word", "Adobe Reader" and the like. In the present example, the electromagnetic signal processing device can directly convert handwritten input symbols into the corresponding control symbols and input the corresponding control symbols to the application programs for control, and the existing application programs do not need to be improved. The number of commands can be expanded by enriching pre-stored banks of the shortcut symbols and the control symbols, and the expanding performance is good.

FIFTH EXAMPLE

Figure 6:
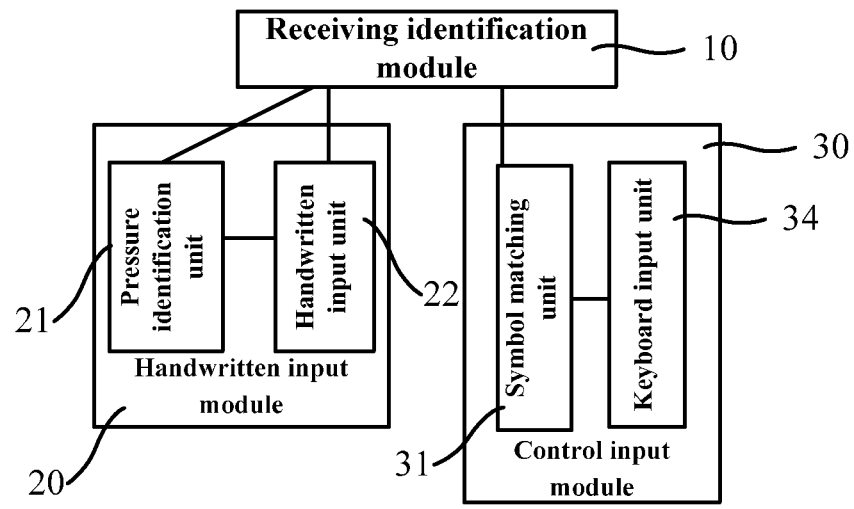
FIG. 6 is a structural schematic diagram of an electromagnetic signal processing device provided by a fifth example of the present invention.

FIG. 6 is a structural schematic diagram of an electromagnetic signal processing device provided by a fifth example of the present invention. The difference between this example and the abovementioned fourth example is that the control input module 30 specifically comprises the symbol matching unit 31 and a keyboard input unit 34, wherein the symbol matching unit 31 is configured to compare the sliding track and the preset shortcut symbols when the identified frequency of the electromagnetic signal is within the range of the control frequency; and the keyboard input unit 34 is configured to generate a corresponding keyboard input signal as a control symbol when the sliding track is successfully matched with the shortcut symbols, and the keyboard input signal can be transmitted to the current running program for performing the control operation.

This example can directly convert the handwritten input symbols into keyboard input symbols, for example, the sliding tracks consistent with the shortcut symbols of "←", "↑", "↓" and "→" are converted into the up key input, the down key input, the left key input and the right key input on the keyboard, and that is equal to pressing the keyboard for input, so as to generate the control of the keyboard input for the current running program.

This example can be convenient for the input control and memorizing of the user, and is beneficial for operation.

Similarly, the control input module 31 also specifically comprises a mouse input unit, wherein the mouse input unit is configured to generate a corresponding mouse input signal according to the electromagnetic signal when the identified frequency of the electromagnetic signal is within the range of the control frequency, and the mouse input signal serves as the control symbol to be input. For example, the input signal such as a left click signal, a right click signal, a left double-click signal and the like of the mouse can be correspondingly input according to different control frequency values. Or, the different mouse input signal can be correspondingly input by combining the control frequency and the sliding track of the electromagnetic pen.

Or, the control input module 31 further comprises a safety control unit. The safety control unit is configured to generate a safety control signal such as a corresponding encryption signals, a decryption signal, a screen protection signal or a disk locking signal according to electromagnetic signal when the identified frequency of the electromagnetic signal is within the range of the control frequency, and the safety control signal is taken as the control symbol to be input. Different safety control signals such as the encryption signal, the decryption signal, the screen protection signal or the disk locking signal are correspondingly input according to different control frequency values. Or, the safety control signal can be determined by combining the control frequency with the sliding track of the electromagnetic pen. The safety control signal can be set by the user or can be the specific safety control operation inside the computer. Basic input/output system (BIOS) information of the computer can be modified as required; therefore, the computer can receive rich and various control symbols which are input by the electromagnetic pen after being converted by the electromagnetic signal processing device, so as to realize rich control functions on the computer.

SIX EXAMPLE

Figure 7:
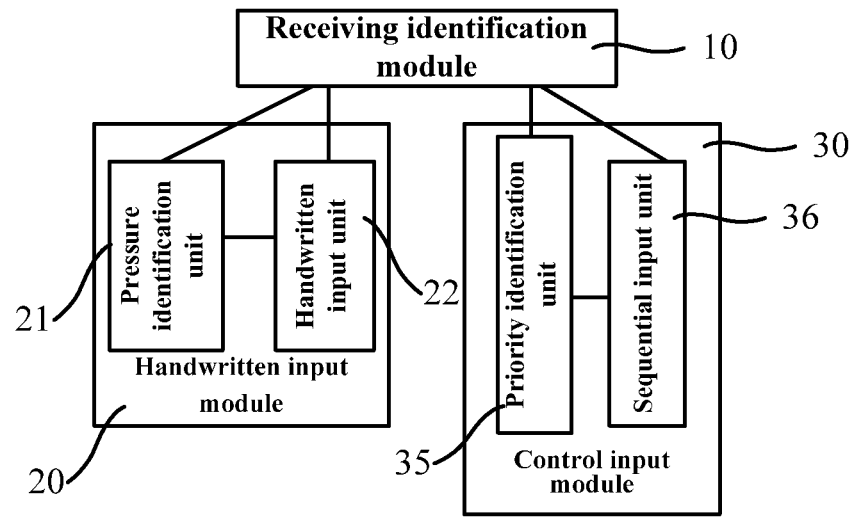
FIG. 7 is a structural schematic diagram of an electromagnetic signal processing device provided by a sixth example of the present invention.

FIG. 7 is a structural schematic diagram of an electromagnetic signal processing device provided by a sixth example of the present invention; the difference between the present example and the fourth example is that a control input module 30 particularly comprises a priority identification unit 35 and a sequential input unit 36, wherein the priority identification unit 35 is configured to identify a priority of the frequency range of each of the electromagnetic signals when multiple electromagnetic signals are received and the identified frequencies of the electromagnetic signals are within the range of the control frequency; and the sequential input unit 36 is configured to convert the sliding tracks into the control symbols according to the identified priorities and input the control symbols to the current running program or a controller and the like in priority order.

The technical solution of the present example is applicable to the situation that the electromagnetic signals transmitted simultaneously by multiple electromagnetic pens are input. As the multiple electromagnetic pens simultaneously transmit the electromagnetic signals with different frequencies, the priority identification unit 35 firstly identifies the sliding track and frequency of each of the electromagnetic signals, and determines the priority of each frequency. Different priorities correspond to different prestored shortcut symbols, so as to correspond to different processing modes. The sequential input unit converts the control symbols according to the priorities of the electromagnetic signals.

The technical solution of the present example supports the situation that simultaneous inputs are performed by multiple electromagnetic pens. The electromagnetic pens may transmit the electromagnetic signals with different frequencies by means of buttons, such that the priorities of the electromagnetic signals may be distinguished; and therefore repetitive control or contradictory control is avoided. For example, when one electromagnetic pen simulates the input function of a mouse, a cursor moves to follow the pen tip of the electromagnetic pen; but when multiple electromagnetic pens are used, the random movement of the cursor occurs. With the adoption of the frequency conversion technology of the present example, the electromagnetic signal processing device identifies the priorities of the electromagnetic pens according to the frequencies, and selects the pen which transmits the electromagnetic signal with a certain frequency as a primary function pen and other pens as secondary function pens. When the control symbols are simultaneously input, actions of the primary function pen are input firstly; and when the primary function pen has no actions, the control symbol of the electromagnetic signal in the lower priority is input. Or, the electromagnetic signal of each of the electromagnetic pens is adopted in an intermittent way. In this case, the control sequence can be distinguished, so as to satisfy the function that multiple electromagnetic pens simultaneously operate and control the system.

SEVENTH EXAMPLE

Figure 8:
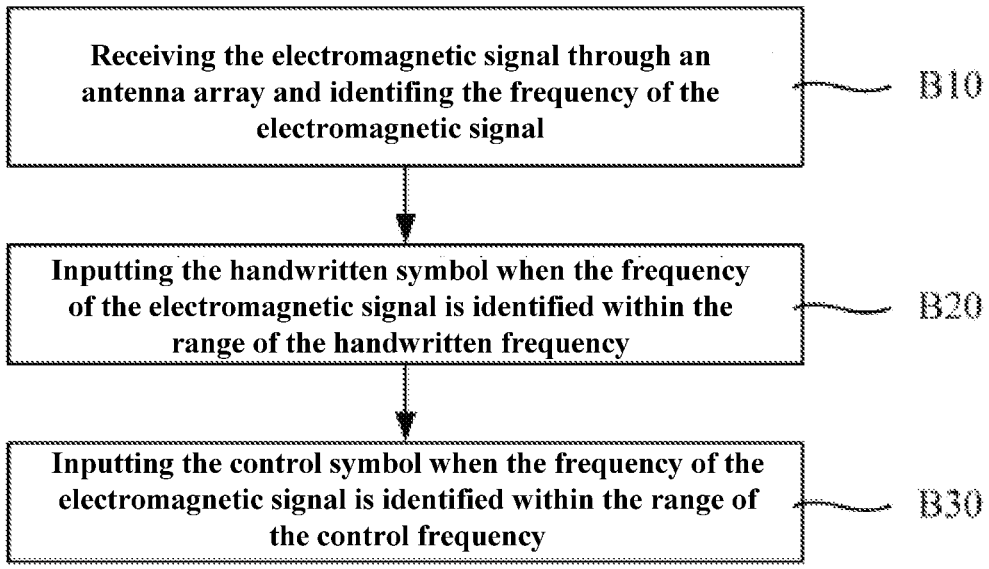
FIG. 8 is a flow diagram of an electromagnetic signal processing method provided by a seventh example of the present invention.

FIG. 8 is a flow diagram of an electromagnetic signal processing method provided by a seventh example of the present invention; and the present example is particularly implemented by the abovementioned electromagnetic signal processing device, comprising the steps:

Step B10, the electromagnetic signal processing device receives the electromagnetic signal through an antenna array and identifies the frequency of the electromagnetic signal;

Step B20, when the frequency of the electromagnetic signal identified by the electromagnetic signal processing device is within the range of the handwritten frequency, the handwritten symbol is input; and Step B30, when the frequency of the electromagnetic signal identified by the electromagnetic signal processing device is within the range of the control frequency, the control symbol is input.

With the adoption of the above technical solution, the input modes can be switched by changing the frequency of the electromagnetic signal; and within the range of the control frequency, the electromagnetic signals with different frequency values can correspond to different control symbols; therefore the control functions can be changed by changing the transmission frequencies. In this case, particularly, the input of the control symbols can be the input of the corresponding control symbols inquired and acquired according to the frequency values of the electromagnetic signals.

Furthermore, the electromagnetic signal can be transmitted by the electromagnetic pen; after the electromagnetic signal transmitted by the electromagnetic pen is received, the steps further comprise the operation of identifying the sliding track of the electromagnetic pen transmitting the electromagnetic signal; and the frequency of the electromagnetic signal and the sliding track of the electromagnetic pen are combined to determine the handwritten symbol or control symbol. In this case, the content of the control symbols can be richer.

Based on the above technical solution, particularly, the Step B20 can comprise:

Step B21, when the frequency of the electromagnetic signal identified by the electromagnetic signal processing device is within the range of the handwritten frequency, the difference between the frequency of the electromagnetic signal and the handwritten reference frequency is calculated; and the handwritten pressure of the electromagnetic pen can be identified according to the difference; and Step B22, the electromagnetic signal processing device generates the handwritten symbol to be input according to the sliding track and the handwritten pressure.

The above technical solution can further enrich the information of input handwritten symbols, wherein the information comprises not only the sliding track of the electromagnetic pen, but also the pressure information of the electromagnetic pen to press and touch the display screen.

Based on the above technical solution, particularly, the Step B30 can comprise:

Step B31a, when the frequency of the electromagnetic signal identified by the electromagnetic signal processing device is within the range of the control frequency, the device compares the sliding track and preset shortcut symbols;

Step B32a, when the sliding track is successfully matched with the shortcut symbols by the electromagnetic signal processing device, the identification of the current running program is identified; and Step B33a, the electromagnetic signal processing device, according to the identification of the current running program and the shortcut symbols, inquires and acquires corresponding control symbol and transmits the same to the current running program to perform the control operation.

With the adoption of the above technical solution, the corresponding control symbols are converted according to the current running program to control the program, thereby enriching the electromagnetic induction type input control functions and improving the convenience of handwritten input control. The control symbols can be correspondingly generated according to the current running program; the application programs do not need to be improved; only the pre-stored bank prestoring the control symbols needs to be improved; therefore, the expansion is simple and convenient.

EIGHTH EXAMPLE

Figure 9:
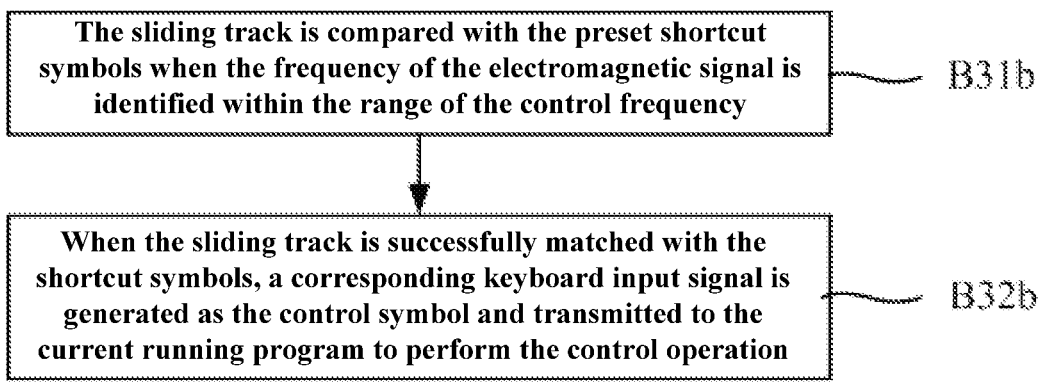
FIG. 9 is a flow diagram of an electromagnetic signal processing method provided by an eighth example of the present invention.

FIG. 9 is a flow diagram for an electromagnetic signal processing method provided by an eighth example 8 of the present invention. The present example can be based on the abovementioned seventh example, and the step B30 particularly comprises the following steps:

Step B31b, when the frequency of the electromagnetic signal is identified by the electromagnetic signal processing device within the range of the control frequency, the sliding track is compared with the preset shortcut symbols by the electromagnetic signal processing device;

Step B32b, when the sliding track is successfully matched with the shortcut symbols by the electromagnetic signal processing device, a corresponding keyboard input signal is generated as the control symbol to be input. The keyboard input signal can be transmitted to the current running program to perform the control operation.

On the basis of the abovementioned technical solution, the corresponding keyboard input signal is generated as the control symbol to be input, which particularly comprises:

the corresponding keyboard input signal is generated as the control symbol by the electromagnetic signal processing device, and the control symbol is transmitted to the current running program;

when the current running program receives the control symbol, the control symbol is compared with a preset shortcut control table; when the control symbol is successfully matched, the corresponding operation is performed.

The present example can directly convert the sliding track input by the electromagnetic pen into the keyboard input, that is, the keyboard input is used to control the current running program so as to facilitate the shortcut operation.

Similar to the abovementioned technical solution, inputting control symbol can also particularly comprise the following steps: a corresponding mouse input signal is generated according to the electromagnetic signal and is then used as the control symbol to be input.

Or, inputting control symbol can also particularly be: according to the electromagnetic signal, a corresponding safety control signal such as an encryption signal, a decryption signal, a screen protection signal or a disc locking signal is generated as the control symbol to be input.

The mouse input signals such as a left click signal, a right click signal and a left double-click signal and the like or various safety control signals can be input according to different control frequency values. The different mouse input signals or safety control signals can also be input by combining the control frequency with the sliding track of the electromagnetic pen.

The safety control signals can be set by the user or can be the specific safety control operations inside the computer. Basic input/output system (BIOS) information of the computer can be modified as required; therefore, the computer can receive rich and various control symbols which are input by the electromagnetic pen after being converted by the electromagnetic signal processing device so as to realize rich control functions on the computer.

NINTH EXAMPLE

Figure 10:
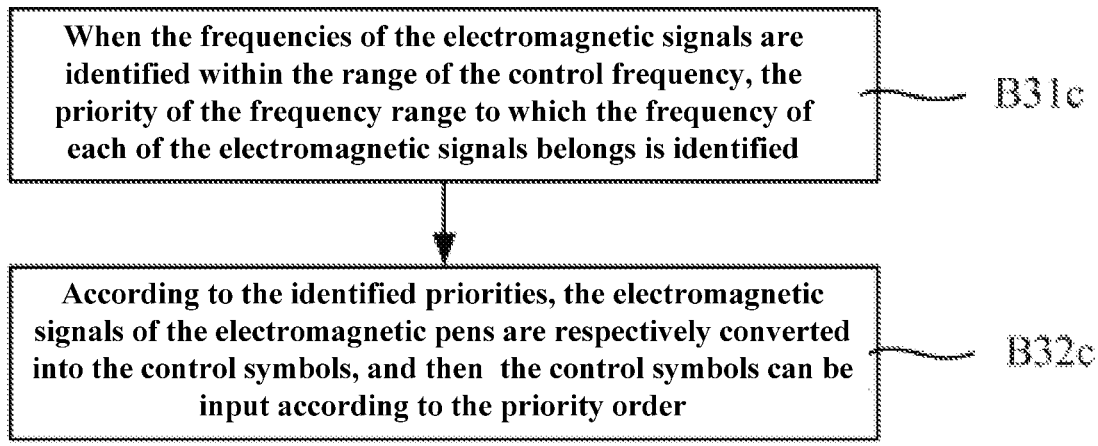
FIG. 10 is a flow diagram of an electromagnetic signal processing method provided by a ninth example of the present invention.

FIG. 10 is a flow diagram for an electromagnetic signal processing method provided by a ninth example 9 of the present invention. The present example can be based on the seventh example. In the step B10, if the electromagnetic signals respectively transmitted by a plurality of electromagnetic pens are received through the antenna array, the step B30 particularly comprises the following steps:

Step B31c, when the frequencies of the electromagnetic signals are identified by the electromagnetic signal processing device within the range of the control frequency, the priority of the frequency range to which each of the electromagnetic signals belongs is identified;

Step B32c, according to the identified priorities, the electromagnetic signals of the electromagnetic pens are respectively converted into the control symbols by the electromagnetic signal processing device; for example, the control symbols are converted according to the frequency values and the sliding tracks, and then can be input in priority order.

With the adoption of the technical solution of the present example, the simultaneous operations of the multiple electromagnetic pens can be supported, the control priority of each of the electromagnetic pens can be distinguished according to the frequency of the electromagnetic signal, the control symbols are converted and sequentially input in priority order, so that the conflict phenomenon caused by the control of the multiple electromagnetic pens can be avoided.

TENTH EXAMPLE

The tenth example of the present invention provides an electromagnetic induction apparatus which comprises the electromagnetic pen of any one example of the present invention and the electromagnetic signal processing device of any one example of the present invention. The electromagnetic induction apparatus also comprises an antenna array, a display panel and a control processor. The antenna array is connected with the electromagnetic signal processing device, and configured to receive the electromagnetic signal transmitted by the electromagnetic pen and transmit the electromagnetic signal to the electromagnetic signal processing device for identification. The electromagnetic signal processing device is connected with the control processor, and configured to input the identified handwritten symbol or control symbol to the control processor. The control processor can particularly be a processing device such as a CPU. The antenna array can overlap with the display panel to be used as a touch screen structure.

The antenna array used by the examples of the present invention can overlap with any control panel, and it can be generally integrated within the terminal with display screen, such as a handwriting board, a professional drawing board, a computer, a PDA and a mobile phone; or, it can be arranged in front of or in back of the display screen according to the requirement. The electromagnetic signal processing device can be arranged in the terminal in the form of hardware and/or software, can be connected with the operating system in the terminal, and transmit the control symbols or the handwritten symbols. The operating system is not limited, for example, it may be "Windows", "Linux", "Mac" and the like. The electromagnetic induction apparatus of the example of the present invention can particularly be the apparatus such as a notebook computer, a desktop computer and the like.

Those of ordinary skill in the art may understand that, all or a portion of the steps in the above method examples may be implemented by instructing relevant hardware via a program. The program may be stored in a computer-readable storage medium. Once the program is executed, the steps of the above method examples are accordingly performed. The above storage medium includes any medium capable of storing program codes such as a ROM, a RAM, a magnetic disk, or an optical disk.

Finally, it should be noted that the above examples are merely provided for describing the technical solutions of the present invention, but not intended to limit the present invention. It should be understood by those of ordinary skill in the art that although the present invention is described in detail with reference to the foregoing examples, modifications can be made to the technical solutions described in the foregoing examples, or equivalent replacements can be made to some technical features in the technical solutions, without the essence of corresponding technical solutions departing from the spirit and scope of the examples of the present invention.

What is claimed is:

1. An electromagnetic pen, comprising:
    a reference induction and a reference capacitor, which are connected with each other in parallel in a housing of the electromagnetic pen and configured to transmit an electromagnetic signal in a handwritten frequency; and
    at least one control capacitor, which is connected with the reference capacitor in parallel;
    each of the control capacitors is respectively connected with one control switch in series, and the control switch is on or off for connection or disconnection between the control capacitor and the reference capacitor, thereby an electromagnetic signal in a control frequency can be transmitted;
    wherein the reference inductance and the reference capacitor, which are connected with each other in parallel, are connected with a power supply circuit, and a power control loop is connected in the power supply circuit, the power control loop comprises:
    a boost unit, which connects the reference inductance and the reference capacitor with the power supply circuit, is configured to carry out a boost processing for the voltage of the battery to obtain a normal working voltage of the electromagnetic pen which can drive the reference inductance and reference capacitor to transmit the electromagnetic signal when the boost function of the boost unit is enabled;
    a first transistor, which is connected with the boost unit and configured to generate and transmit an enable signal to the boost unit when the first transistor is turned on and the emitter of the first transistor outputs a high level to the enable signal, thereby a boost function of the boost unit is enabled;
    a second transistor, which is connected with the base of the first transistor and configured to turn on the first transistor when the second transistor is turned on and the collector of the second transistor output a low level to the base of the first transistor, the first transistor and second transistor are both active switching elements; and at least one charging and discharging capacitor, which is connected in the power supply circuit through any of the control switches, and configured to be charged by the power supply circuit when any of the control switches is on, and supply power to the base of the second transistor and turn on the second transistor, the charging and discharging capacitor can maintain supplying power to keep the second transistor being turned on for a maintaining time when all of the control switches are off, the maintaining time can be determined by selecting the capacitance value of the charging and discharging capacitor; if none of the control switches is turned on again during the maintaining time, as a result of the charging and discharging capacitor discharging, the second transistor can be automatically turned off and output a high level which turns off the first transistor, so the emitter of the first transistor outputs a low level to the enable signal, thereby the boost unit cannot carry out a boost processing for the voltage of the battery, and the reference inductance and reference capacitor stop transmitting the electromagnetic signal.

2. The electromagnetic pen of claim 1, further comprising:
at least one control button, which is provided on the housing of the electromagnetic pen, connected with the control switch and configured to turn on or off the control switch.

3. The electromagnetic pen of claim 1, wherein:
the reference inductance comprises a magnetic core and an inductance coil, the magnetic core is wound with the inductance coil, and elastically bears against a pen tip extending out of the housing of the electromagnetic pen by means of an elastic device; when the magnetic core moves axially along the inductance coil, an inductance parameter is changed, thereby the frequency of the transmitted electromagnetic signal is changed.

4. The electromagnetic pen of claim 2, wherein:
the reference inductance comprises a magnetic core and an inductance coil, the magnetic core is wound with the inductance coil, and elastically bears against a pen tip extending out of the housing of the electromagnetic pen by means of an elastic device; when the magnetic core moves axially along the inductance coil, an inductance parameter is changed, thereby the frequency of the transmitted electromagnetic signal is changed.

5. The electromagnetic pen of claim 1, wherein the power control loop further comprises:
a low-voltage detecting unit, which is connected in the power supply circuit, and configured to detect a power supply voltage and transmit an alerting signal when the power supply voltage is lower than a preset voltage value.

* * * * *